United States Patent Office 3,484,230
Patented Dec. 16, 1969

3,484,230
2,4-DICHLOROPHENYL 4'-NITROPHENYL ETHER AND N-(3,4-DICHLOROPHENYL)-N'-METHYL-N'-n-BUTYL UREA, SYNERGISTIC HERBICIDAL COMPOSITION
Pierre Poignant and Pierre Crisinel, Lyon, France, assignors to Pechiney-Progil, Lyon, France, a coporation of France
No Drawing. Filed July 26, 1968, Ser. No. 747,817
Claims priority, application France, July 28, 1967, 48,976
Int. Cl. A01n 9/20, 7/04
U.S. Cl. 71—120     5 Claims

ABSTRACT OF THE DISCLOSURE

A synergistic weed-killing composition which is a mixture of nitrofen (2,4-dichlorophenyl 4'-nitrophenyl ether) and neburon (N-(3,4-dichlorophenyl)-N'-methyl-N'-n-butyl urea) and its use as a selective herbicide in cereal crops.

---

The present invention relates to new weed-killing compositions, adapted to be used for cleaning cereal fields.

It relates more particularly to compositions containing a mixture of 2,4-dichlorophenyl 4'-nitrophenyl ether (common name: nitrofen) and of N-(3,4-dichlorophenyl)-N'methyl-N'-n-butyl-urea (common name: neburon).

As a matter of fact, it has been found that the simultaneous presence of the two above-mentioned components generates a phenomenon of synergy, that is, each of the products increases unexpectedly the weed-killing properties of the other.

Such synergy shows itself with highly varying ratios of said components, ranging from 1 part of nitrofen to from 0.1 to 30 parts of neburon. This synergy is particularly conspicuous in compositions containing 1 part of nitrofen to from 0.5 to 10 parts of neburon, while the best results were obtained with ratios of 1 part of nitrofen to from 1 to 5 parts of neburon.

In a general way, synergy is noted between two pesticides when the activity of the mixture thereof at a given dosage is higher than the activity of each of the components used alone at the same dosage. Some authors have given a more accurate mathematical formulation of the notion of synergy.

The following examples point up the existence of such a phenomenon between nitrofen and neburon, with either of the methods described:

TEST NO. 1

Cereal variety: Corn ("Etoile de Choisy").
Treatments: Performed the day after the sowing.
The experiment was conducted on unit plots of 30 square metres each, was repeated twice, and included the following treatments:

Plot No. 1.—2.5 kg./ha. of nitrofen
Plot No. 2.—2.5 kg./ha. of neburon
Plot No. 3.—2.5 kg./ha. of the mixture containing 1 part of nitrofen for 4 parts of neburon
Plot No. 4.—Untreated pilot plot.

Three months after the treatment, the condition of the various plots were evaluated.

The pilot plot was widely overrun with adventitious weeds, essentially comprising *Veronica sp., Stellaria media, Alopecurus myosuroides, Polygonum sp., Sinapsis arvensis, Renonculus arvensis*.

In each of the plots treated an evaluation was made of the percentage of adventitious weed-killing, with the following results:

|  | Percent |
|---|---|
| Nitrofen | 64 |
| Neburon | 70 |
| Nitrofen+neburon | 90 |

As regards this last figure, besides, the growth of the remaining 10% of adventitious weeds had been definitely slowed down, and its influence on the cereal growth was quite immaterial.

TEST NO. 2

This test allows showing up the synergy between nitrofen and neburon, according to the method disclosed by Colby in the magazine "Weeds," January 1967, pp. 20–22.

Let us resume the principle of said method:

Assuming $X_1$ is the percentage of plants not killed by herbicide A at the dose $p$, and $Y_1$ is the percentage of plants not killed by herbicide B at the dose $q$, the "expected" percentage, $E_1$, of plants not killed by the mixture $(A+B)$ at the dose $(p+q)$ is:

$$E_1 = \frac{X_1 \cdot Y_1}{100}$$

Then, it is only necessary to compare $E_1$ with the actual percentage, $E$, of plants not killed by $(A+B)$ at the dose $(p+q)$ to know the character of the combined action of the two herbicides.

If $E_1$ is higher than $E$, there is synergy. In the opposite case, there is antagonism.

The experiment was conducted, as in Test 1, on plots of corn (variety "Magali") sown on Nov. 22, and treated on Dec. 1, so as to supply respectively:

Plot No. 1.—1 kg./ha. of nitrofen
Plot No. 2.—2 kg./ha. of neburon
Plot No. 3.—(1+2) kg./ha. of nitrofen+neburon
Plot No. 4.—Untreated pilot plot.

On Apr. 14 next, the following results were noted:

Plot No. 1.—60% of adventitious plants present
Plot No. 2.—20% of adventitious plants present
Plot No. 3.—0% of adventitious plants present.

As regards the pilot plot, it was widely overrun by the following adventitious plants: *Veronica sp., Papaver rhoeas, Raphanus raphanistrum, Rumex acetosella,* and *Avena ludoviciana*.

When applying the calculations of Colby to the above results, there is obtained:

$$E_1 = \frac{X_1 \cdot Y_1}{100} = 12 \qquad (E=0)$$

whereby $E_1 - E = +12$, that is, a synergy.

TEST No. 3

This test corresponds to a weed-killing treatment performed on corn (variety "Moisson"), the day after the sowing, in a manner such as to supply respectively:

Plot No. 1.—1.5 kg./ha. of nitrofen
Plot No. 2.—2 kg./ha. of neburon
Plot No. 3.—nitrofen+neburon, 1.5+2 kg./ha.
Plot No. 4.—Untreated pilot plot.

On Mar. 8, the following results were noted:

Plot No. 1.—50% of adventitious plants present
Plot No. 2.—44% of adventitious plants present
Plot No. 3.—10% of adventitious plants present.

When applying the same calculations as in the previous test, a synergy of 12 is found.

The adventitious plants present in the pilot plot were essentially: *Alopecurus sp., Poa annua, Raphanus raphanistrum*.

The compositions according to the invention show thus a definite economical advantage, since, with equal doses, the results obtained from the mixture are widely better than those obtained when each product is used alone.

Besides, said compositions have a scope of activity and a persistent action which are quite outstanding.

As a matter of fact, most of the adventitious plants present in cereal fields, both Gramineae, such as *Alopecurus sp., Lolium sp., Agrostis sp., Avena sp., Lolium temulentum,* and dicotyledons, such as *Galium aparine, Veronica sp., Viola tricolor, Papaver rhoeas, Polygonum sp., Matricaria sp., Ranonculus sp., Centaurea cyanus, Stellaria media,* and so on, are killed, or, at least, very efficiently checked by the compositions of the invention.

Besides, the use of said herbicides before the cereals start growing, allows destroying the adventitious plants at a stage where they are either not yet germinated, or still very young plantlets, so that they cannot be very prejudicial to the cereals. Lastly, the compositions of the invention have an activity both quick and lasting, which enables the ground to remain clean for several months.

The quantities of active material to be used per hectare may vary within certain limits, depending on the nature of the ground and the development of adventitious plants. In general, amounts ranging from 1 to 5 kg./ha. should be adequate for obtaining the weed-killing action desired.

The mixtures of active materials according to the invention should be formulated according to the well known methods used in the pesticide industry, with a view to using them practically, while making them easy to handle, and giving them a maximum activity.

To this end, a number of carriers and adjuvants may be added to the active materials, depending on the nature of the formulation contemplated, and the results to be obtained.

Such formulations are either in liquid form, such as emulsions, true solution, slurries, suspensions, and the like, ready for use or to be water-diluted, or in solid form, such as wettable powders, grandules, and the like, to be used as such, or to be dispersed in a liquid medium before use.

Said compositions include then carriers, generally inert ones, and/or mineral, organic or mixed solvents, and/or emulsifying agents, sticking agents, anti-caking agents, deflocculating agents, and the like.

What we claim is:

1. A weed-killing composition consisting essentially of a mixture of 1 part of 2,4-dichlorophenyl 4'-nitrophenyl ether and from 0.1 to 30 parts of N-(3,4-dichlorophenyl)-N'-methyl-N'-n-butyl urea.

2. A weed-killing composition according to claim 1 wherein the ratio of ingredients in the mixture is 1 part of the first named ingredient to 0.5–10 parts of the second ingredient.

3. A weed-killing composition according to claim 1 wherein the ratio of ingredients in the mixture is 1 part of the first named ingredient to from 1–5 parts of the second ingredient.

4. A method of killing weeds in cereal fields without harm to the cereals, comprising treating the ground in which cereals have just been sown with the weed-killing composition of claim 1, said ether and said urea being present in said composition in amounts and proportions sufficient to provide in the presence of each other, control of growth of weeds.

5. A method in accordance with claim 4, wherein from 1 to 5 kg./ha. of said composition are used.

References Cited

UNITED STATES PATENTS

| 3,374,083 | 3/1968 | Loux | 71—92 |
| 3,154,398 | 10/1964 | McRae | 71—118 |
| 3,148,048 | 9/1964 | Newcomer et al. | 71—118 |

OTHER REFERENCES

Index, Chem. Abs., 2307s, vol. 64 (1966).

LEWIS GOTTS, Primary Examiner

CATHERINE L. MILLS, Assistant Examiner

U.S. Cl. X.R.

71—124